United States Patent
Hausman (10) Patent No.: US 12,370,464 B2
(45) Date of Patent: Jul. 29, 2025

(54) BOTANICAL PROCESSING MODULE

(71) Applicant: Hausman Properties, LLC, Houston, TX (US)

(72) Inventor: Brian Hausman, Houston, TX (US)

(73) Assignee: Hausman Properties, LLC, Houston, TX (US)

( * ) Notice: Subject to any disclaimer, the term of this patent is extended or adjusted under 35 U.S.C. 154(b) by 1173 days.

(21) Appl. No.: 17/136,969

(22) Filed: Dec. 29, 2020

(65) Prior Publication Data
US 2021/0121793 A1 Apr. 29, 2021

Related U.S. Application Data

(63) Continuation-in-part of application No. 15/931,773, filed on May 14, 2020.

(60) Provisional application No. 62/847,393, filed on May 14, 2019.

(51) Int. Cl.
| | |
|---|---|
| *B01D 11/02* | (2006.01) |
| *B02C 18/00* | (2006.01) |
| *H04L 9/00* | (2022.01) |
| *H04L 9/06* | (2006.01) |

(52) U.S. Cl.
CPC ........ *B01D 11/0207* (2013.01); *H04L 9/0643* (2013.01); *B01D 11/0203* (2013.01); *B01D 11/0288* (2013.01); *B02C 18/00* (2013.01); *H04L 9/50* (2022.05)

(58) Field of Classification Search
None
See application file for complete search history.

(56) References Cited

U.S. PATENT DOCUMENTS

| | | | | | |
|---|---|---|---|---|---|
| 2,240,841 | A | * | 5/1941 | Flynn | B01F 27/112 241/98 |
| 3,729,096 | A | * | 4/1973 | Fitzner | B07B 1/22 209/406 |
| 4,427,453 | A | * | 1/1984 | Reitter | C13K 1/02 127/1 |
| 4,612,286 | A | * | 9/1986 | Sherman | C12P 7/06 435/165 |
| 5,338,366 | A | * | 8/1994 | Grace | C13B 10/14 162/14 |
| 6,409,841 | B1 | * | 6/2002 | Lombard | C13K 1/02 162/1 |

(Continued)

FOREIGN PATENT DOCUMENTS

WO 2017007806 1/2017

*Primary Examiner* — Robert J Popovics (57) ABSTRACT

The disclosure provides a botanical processing module, comprising a housing, wherein the housing comprises a plurality of surfaces, wherein there is an internal cavity defined between the plurality of surfaces; a first inlet disposed on a top surface of the housing; a second inlet disposed on a first side surface of the housing, wherein the first side surface is orthogonal to the top surface; a first outlet disposed on the first side surface; a controller, wherein the controller comprises a processor; a memory; and a network interface; a first heating chamber; and a liquid composition analyzer; wherein the first heating chamber and the liquid composition analyzer are disposed within the internal cavity of the housing, wherein the liquid composition analyzer is communicatively coupled to the processor of the controller.

9 Claims, 7 Drawing Sheets

(56) References Cited

U.S. PATENT DOCUMENTS

| | | | |
|---|---|---|---|
| 8,002,979 B2 * | 8/2011 | Bryan-Brown | E03C 1/2665 241/DIG. 38 |
| 8,597,431 B2 * | 12/2013 | McDonald | C13K 1/02 127/1 |
| 9,393,505 B2 * | 7/2016 | Rusconi Clerici | B04B 5/10 |
| 9,492,854 B2 * | 11/2016 | Slanina | B09B 5/00 |
| 9,608,829 B2 | 3/2017 | Spanos et al. | |
| 10,533,203 B2 * | 1/2020 | Carlson | C12M 45/02 |
| 11,013,260 B1 * | 5/2021 | Schreiber | A24B 7/04 |
| 11,911,719 B2 * | 2/2024 | Brancazio | B01D 29/608 |
| 12,036,485 B1 * | 7/2024 | Smith | B01D 11/0288 |
| 12,053,750 B2 * | 8/2024 | Zhang | B01F 27/17 |
| 12,083,526 B1 * | 9/2024 | Nassef | B01F 27/90 |
| 12,188,719 B2 * | 1/2025 | Hausman | B01D 1/0011 |
| 12,251,651 B2 * | 3/2025 | Brancazio | B01D 35/18 |
| 2009/0075325 A1 * | 3/2009 | Das | G01N 24/08 250/311 |
| 2011/0079219 A1 * | 4/2011 | McDonald | C13K 1/02 127/1 |
| 2012/0261320 A1 * | 10/2012 | Slanina | C05F 17/10 210/151 |
| 2015/0136683 A1 * | 5/2015 | Rusconi Clerici | B01D 33/00 210/368 |
| 2015/0147797 A1 * | 5/2015 | Johnson | G01N 21/84 435/165 |
| 2016/0027229 A1 | 1/2016 | Spanos et al. | |
| 2016/0260169 A1 | 9/2016 | Arnold et al. | |
| 2016/0292672 A1 | 10/2016 | Fay et al. | |
| 2016/0317953 A1 * | 11/2016 | Canaia | B29C 48/693 |
| 2017/0048216 A1 | 2/2017 | Chow et al. | |
| 2017/0103468 A1 | 4/2017 | Orsini et al. | |
| 2017/0177898 A1 | 6/2017 | Dillenberger | |
| 2017/0212781 A1 | 7/2017 | Dillenberger et al. | |
| 2019/0206536 A1 * | 7/2019 | Hausman | H04L 9/3247 |
| 2021/0086112 A1 * | 3/2021 | Brancazio | B01D 29/03 |
| 2021/0121793 A1 * | 4/2021 | Hausman | H04L 9/0643 |
| 2021/0247138 A1 * | 8/2021 | Hausman | A23N 12/083 |
| 2022/0117297 A1 * | 4/2022 | Schreiber | A61L 9/03 |
| 2022/0305448 A1 * | 9/2022 | Zhang | B01F 27/82 |
| 2024/0066443 A1 * | 2/2024 | Brancazio | B01D 29/86 |

* cited by examiner

BOTANICAL PROCESSING MODULE

CROSS-REFERENCE TO RELATED APPLICATIONS

The present application is a continuation-in-part claiming priority to U.S. patent application Ser. No. 15/931,773, filed on May 14, 2020, which claims priority to U.S. Provisional Application No. 62/847,393, filed on May 14, 2019, which are incorporated herein by reference in their entirety.

BACKGROUND

Current tools exist for separate processes of grinding, shredding, packing, heating, and analyzing certain plant matter.

BRIEF DESCRIPTION OF THE DRAWINGS

For a more complete understanding of the present disclosure and its features and advantages, reference is now made to the following description, taken in conjunction with the accompanying drawing, in which.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

The present disclosure relates to systems and methods for a botanical processing module. More particularly, the present disclosure relates to systems and methods for physically altering a deposited sample of designated material through an automated process with the botanical processing module.

Figure 1:
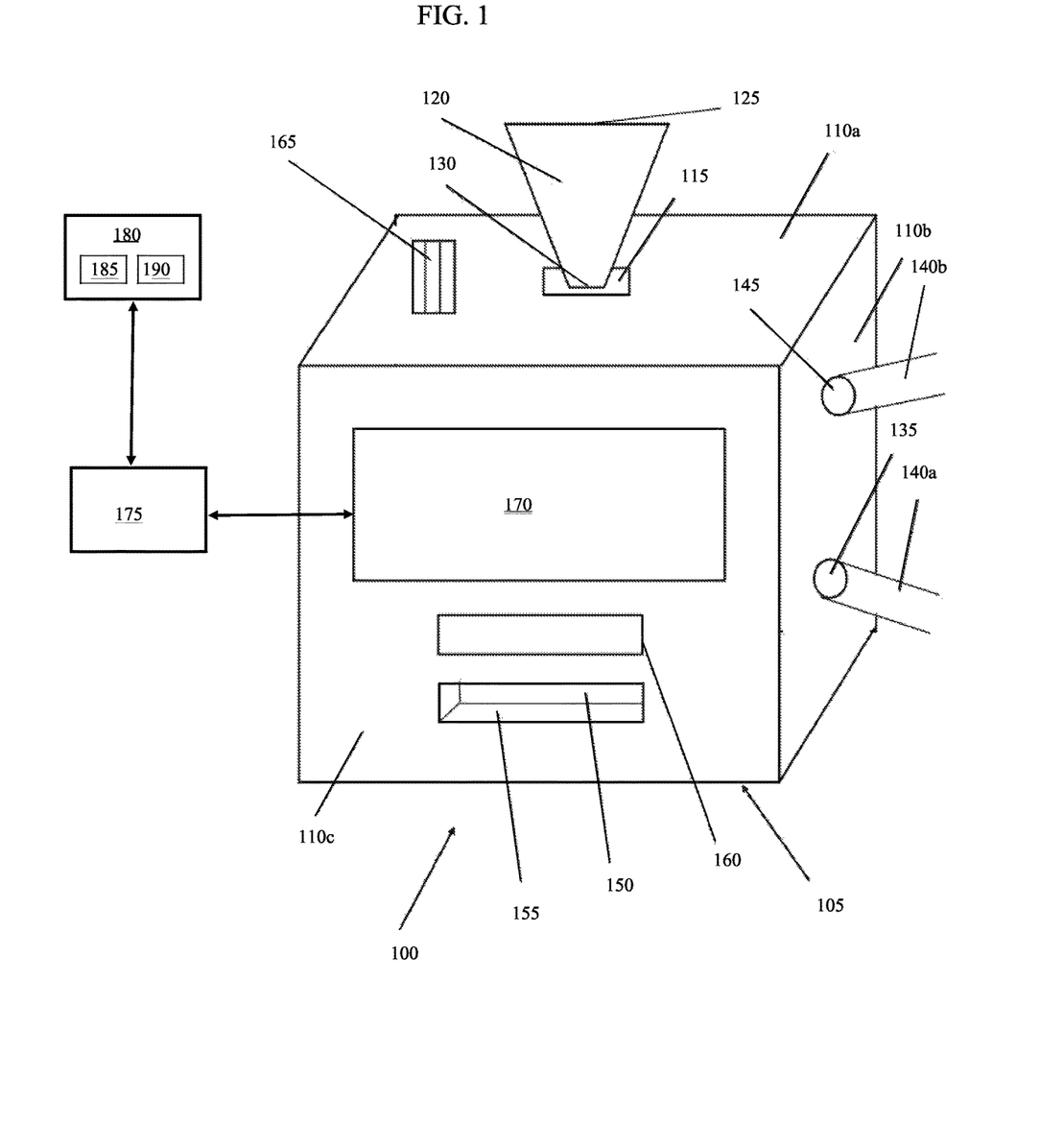
FIG. 1 is an isometric view of a botanical processing module, in accordance with embodiments of the present disclosure.

FIG. 1 illustrates a botanical processing module 100. The botanical processing module 100 may be configured to change the physical state of a designated material deposited therein. In certain embodiments, the botanical processing module 100 may further be configured to change the chemical state of the designated material. In certain embodiments, the botanical processing module 100 may operate automatically once given user input. Without limitations, the botanical processing module 100 may be any suitable size, height, and/or shape. As illustrated, the botanical processing module 100 may comprise a square or rectangular cross-sectional shape. In embodiments, the dimensions, such as height, width, and/or length may be any suitable value. The botanical processing module 100 may comprise any suitable material, including, but not limited to, metals, nonmetals, polymers, ceramics, composites, and/or combinations thereof.

The botanical processing module 100 may comprise a housing 105. In embodiments, the housing 105 may comprise a plurality of surfaces 110. In particular embodiments, for a given surface, the adjacent surfaces may be orthogonal to said given surface. In other embodiments, for a given surface, the adjacent surfaces may be disposed at an angle relative to said given surface. The housing 105 may comprise one or more openings extending through the thickness of a surface 110 of the housing 105. The one or more openings may be functional as either an inlet or an outlet. These one or more openings may be coupled to external equipment through piping and/or conduit. In certain embodiments, there may be a first inlet 115 disposed about a top surface 110a of the housing 105. The first inlet 115 may be any suitable size and/or shape. The first inlet 115 may be configured to allow a material to pass from the exterior of the housing 105 of the botanical processing module 100 to the interior of the housing 105. As illustrated, a funnel 120 may be disposed about the first inlet 115. In embodiments, the funnel 120 may be disposed at least partially through or may be coupled to the first inlet 115. In alternate embodiments, the funnel 120 may be disposed at a distance from the first inlet 115 and coupled to the first inlet 115 via conduit. The funnel 120 may be configured to contain a designated material and to allow said designated material to travel downwards from a top end 125 to a bottom end 130 of the funnel 120 via gravity. In embodiments, the designated material may be any suitable material. Without limitations, the designated material may be a portion of plant matter belonging to the Cannabaceae family. Both the top end 125 and the bottom end 130 may be actuable to open or close, thereby sealing the interior of the funnel 120 from the external environment.

In embodiments, there may be a first outlet 135 disposed on a first side surface 110b of the housing 105. While illustrated on first side surface 110b, first outlet 135 may be disposed about any of the plurality of surfaces 110. The first outlet 135 may be any suitable size and/or shape. The first outlet 135 may be capable of allowing material to pass from the interior of the housing 105 to the exterior of the housing 105. As illustrated, the first outlet 135 may be coupled to external equipment and/or tooling via conduit 140*a*.

In embodiments, there may be a second inlet 145 disposed on the first side surface 110*b* of the housing 105. While illustrated on first side surface 110*b*, second inlet 145 may be disposed about any of the plurality of surfaces 110. The second inlet 145 may be any suitable size and/or shape. The second inlet 145 may be capable of allowing material to pass from the exterior of the housing 105 to the interior of the housing 105. As illustrated, the second inlet 145 may be coupled to external equipment and/or tooling via conduit 140*b*.

In embodiments, there may be a second outlet 150 disposed on a second side surface 110*c* of the housing 105. In embodiments, the second side surface 110*c* may be orthogonal to both the top surface 110*a* and the first side surface 110*b*. While illustrated on second side surface 110*c*, second outlet 150 may be disposed about any of the plurality of surfaces 110. The second outlet 150 may be any suitable size and/or shape. The second outlet 150 may be capable of allowing material to pass from the interior of the housing 105 to the exterior of the housing 105. As illustrated, the second outlet 150 may comprise an internal ledge 155. During operations, material may be deposited from the interior of the housing 105 to the internal ledge 155 to be accessible by an operator.

In embodiments, there may be a third inlet 160 disposed on the second side surface 110*c* of the housing 105. While illustrated on second side surface 110*c*, third inlet 160 may be disposed about any of the plurality of surfaces 110. The third inlet 160 may be any suitable size and/or shape. The third inlet 160 may be capable of allowing material to pass from the exterior of the housing 105 to the interior of the housing 105. In embodiments, the third inlet 160 may be configured to function like a printer tray and receive wrap paper, or a similar paper product. The third inlet 160 may receive and contain any suitable amount of wrap paper. During operations, the botanical processing module 100 may manipulate the wrap paper within the housing 105 through such means as rolling, folding, bending, and any combination thereof.

In embodiments, there may be a third outlet 165 disposed on the top surface 110*a* of the housing 105. While illustrated on top surface 110*a*, third outlet 165 may be disposed about any of the plurality of surfaces 110. The third outlet 165 may be any suitable size and/or shape. The third outlet 165 may be configured to vent fumes and/or gases from the interior of the housing 105 to the external environment. During operations, the third outlet 165 may be actuated to either open or close in order to vent potential fumes and/or gases by a controller 170. The controller 170 may be disposed within and/or communicatively coupled to the botanical processing module 100. In embodiments, the controller 170 may be communicatively coupled to a common network 175 and/or to an external server 180.

The common network 175 may facilitate communication between the botanical processing module 100 and various external components (for example, the server 180). This disclosure contemplates the common network 175 being any suitable network operable to facilitate communication. Common network 175 may include any interconnecting system capable of transmitting audio, video, signals, data, messages, or any combination of the preceding. Common network 175 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In embodiments, the common network 175 may be accessed using a network interface (for example, network interface 211 on FIG. 2). The network interface may be a networking device that is configured to enable wired and/or wireless communications between the common network 175 and other network devices, systems, or domain(s). For example, the network interface may be configured to send and receive data to the common network 175, the botanical processing module 100, and any combinations thereof. The network interface may be configured to use any suitable type of communication protocol as would be appreciated by one of ordinary skill in the art.

The external server 180 is generally a suitable server (e.g., including a physical server and/or virtual server) operable to store data 185 and/or provide access to application(s) 190 or other services with restricted access. The data 185 may be data to be viewed or accessed by a preapproved user. The application 190 may be any suitable application which may be employed to review and/or access the data 185. The external server 180 may be accessed using the example controller 170, the common network 175, and/or any other suitable device.

Figure 2:
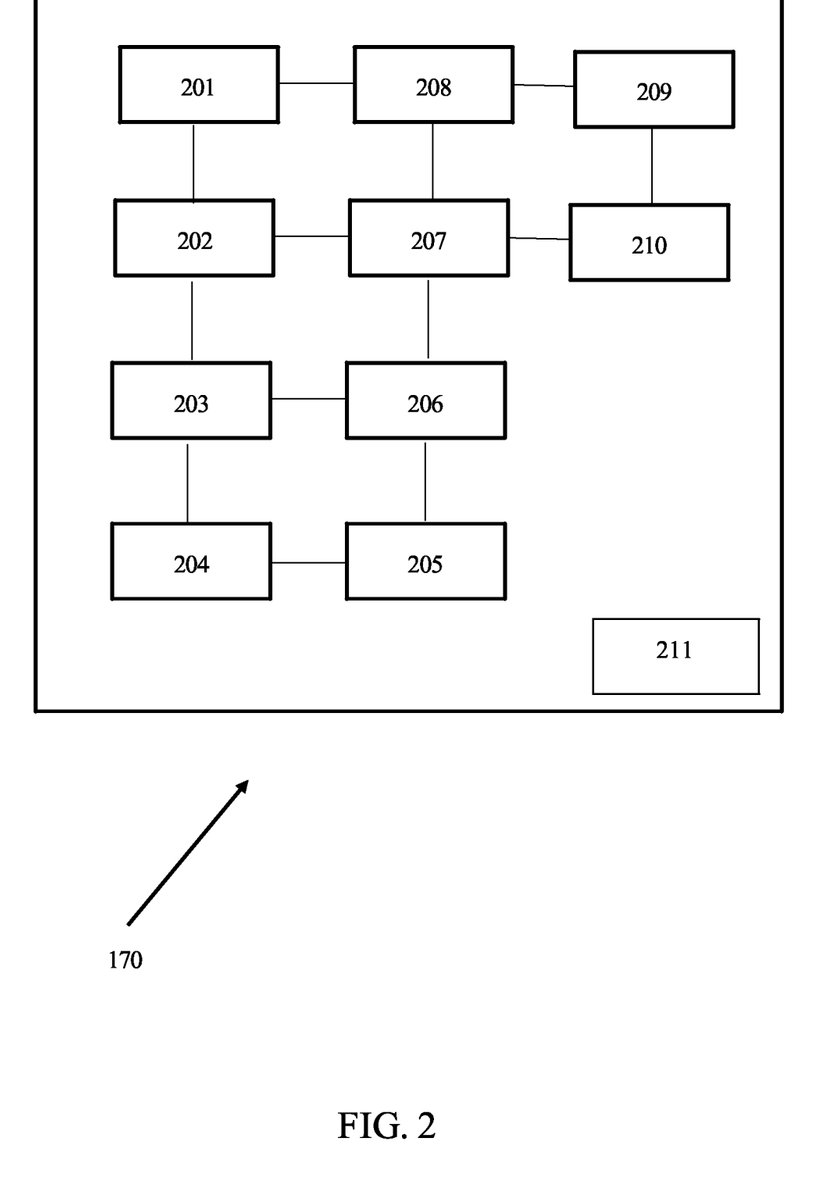
FIG. 2 is a diagram illustrating an example controller, in accordance with embodiments of the present disclosure.

FIG. 2 is a diagram illustrating an example controller 170, according to aspects of the present disclosure. A processor or central processing unit (CPU) 201 of the controller 170 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of controller 170. However, any suitable configurations of components may be used. For example, components of controller 170 may be implemented either as physical or logical components. Furthermore, in some embodiments, functionality associated with components of controller 170 may be implemented in special purpose circuits or components. In other embodiments, functionality associated with components of controller 170 may be implemented in configurable general-purpose circuit or components. For example, components of controller 170 may be implemented by configured computer program instructions.

Memory controller hub (MCH) 202 may include a memory controller for directing information to or from various system memory components within the controller 170, such as memory 203, storage element 206, and hard drive 207. The memory controller hub 202 may be coupled to memory 203 and a graphics processing unit (GPU) 204. Memory controller hub 202 may also be coupled to an I/O controller hub (ICH) or south bridge 205. I/O controller hub 205 is coupled to storage elements of the controller 170, including a storage element 206, which may comprise a flash ROM that includes a basic input/output system (BIOS) of the computer system. I/O controller hub 205 is also coupled to the hard drive 207 of the controller 170. I/O controller hub 205 may also be coupled to a Super I/O chip 208, which is itself coupled to several of the I/O ports of the computer system, including keyboard 209 and mouse 210.

In embodiments, the controller 170 may further comprise a network interface 211. The network interface 211 is configured to enable wired and/or wireless communications. The network interface 211 is configured to communicate data between the botanical processing module 100 and other network devices, systems, or domain(s). For example, the network interface 211 may comprise a WIFI interface, a local area network (LAN) interface, a wide area network (WAN) interface, a modem, a switch, or a router. The processor 201 of the botanical processing module 100 is configured to send and receive data using the network interface 211. The network interface 211 may be configured to use any suitable type of communication protocol as would be appreciated by one of ordinary skill in the art.

In certain embodiments, the controller 170 may contain a set of instructions that when executed cause the processor 201 to perform certain actions. In any embodiment, the controller may include a non-transitory computer readable medium that stores one or more instructions where the one or more instructions when executed cause the processor to perform certain actions. As used herein, an controller may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a controller may be a computer terminal, a network storage device, or any other suitable device and may vary in size, shape, performance, functionality, and price. The controller may include random access memory (RAM), one or more processing resources such as a central processing unit (CPU) or hardware or software control logic, read only memory (ROM), and/or other types of nonvolatile memory. Additional components of the controller may include one or more disk drives, one or more network ports for communication with external devices as well as various input and output (I/O) devices, such as a keyboard, a mouse, and a video display. In embodiments, an operator may operate the controller 170 via a display disposed on the second side surface 110*c* (referring to FIG. 1). The controller 170 may also include one or more buses operable to transmit communications between the various hardware components. In embodiments, the botanical processing module 100 may comprise a power supply (not shown). In alternate embodiments, the botanical processing module 100 may be coupled to an external power supply by any suitable means.

The present disclosure may provide examples of a system and method for processing designated material and communicating analyses of that designated material over a decentralized computing network. The decentralized computing network may include a plurality of computing systems that act as nodes. Each node may access a distributed ledger over the decentralized computing network. The distributed ledger may be a database or consensus of replicated, shared, and synchronized digital data geographically spread across multiple nodes that is independently updated. In examples, the distributed ledger may utilize blockchain technology and protocols. In one or more embodiments, the controller 170 of the botanical processing module 100 may operate as a node within a decentralized computing network.

Figure 3:
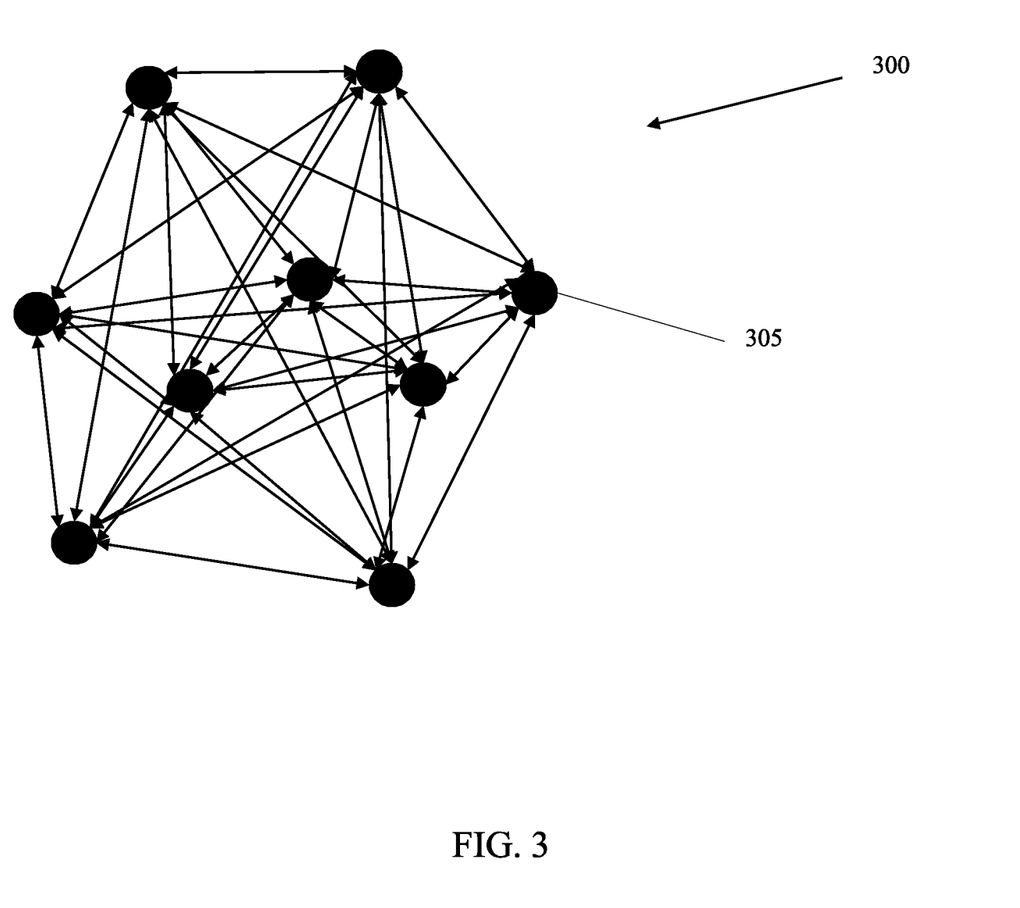
FIG. 3 is a diagram illustrating an example decentralized computing network, in accordance with embodiments of the present disclosure.

FIG. 3 illustrates an example of a decentralized computing network 300. Decentralized computing network 300 may include a plurality of nodes 305. Each node 305 may be operated by an individual, company, and/or other entity. Each node 305 may include a processor, a memory unit, a network interface, and a bus. The memory unit may be volatile and/or non-volatile. Further hardware and/or software may be used by each node 305. Additionally, any suitable input and output (I/O) devices may be implemented. Without limitation, each node 305 may be any suitable computing device. Concerning the present disclosure, computer-readable storage mediums may be utilized. Decentralized computing network 300 may connect the plurality of nodes 305 by any form or medium of digital data communication such as a communication network (for example, common network 175 in FIG. 1). Without limitation, a communication network may include a local area network ("LAN"), a metropolitan area network ("MAN"), a wide area network ("WAN"), peer-to-peer networks (structured, unstructured, and/or hybrid models), grid computing infrastructures, the Internet, and/or combinations thereof.

In examples, decentralized computing network 300 may utilize blockchain technology and protocols for the distributed ledger. However, not all distributed ledgers may necessarily employ blockchain technology to successfully provide secure and valid achievement of distributed consensus. Without limitation, a blockchain may be one type of data structure considered to be a distributed ledger. A blockchain may be a continuously growing list of records. In examples, the records may be represented as blocks. Each block may include transaction data, a hash pointer, a timestamp, and/or combinations thereof. These blocks may be linked and secured using cryptographic measures. Cryptographic measures may include any suitable mathematical algorithm. In examples, a hash function may be used as the cryptographic measure, wherein the hash function is a mathematical algorithm that takes a data input and generates a fixed output (e.g, a bit string with a fixed length). Hash functions may have pre-image resistance, wherein it may be infeasible to invert without using a brute-force method of trying to compare hashed values of random inputs. Hash functions may be collision resistant, wherein it may be infeasible for two given inputs to produce the same output. In examples, a hash function may be designed to be a one-way function.

The methodology behind blockchain may promote a decentralized network over a peer-to-peer network rather than a central computing system. In examples, each of the plurality of nodes 305 may own a full copy of the distributed ledger. When a transaction occurs in the distributed ledger, each of the plurality of nodes 305 may verify the status of the distributed ledger (i.e., with the addition of a new block). A consensus among the plurality of nodes 305 may be required to verify the status of the distributed ledger. Any suitable protocol may be used to reach consensus. Without limitation, suitable protocols may be proof of work, proof of stake, proof of authority, and/or combinations thereof. In examples, this may occur automatically and/or continuously. Once consensus has been reached, the distributed ledger may be updated (i.e., the addition of a block).

In examples, digital signatures may be used in the blockchain. In examples, a public and private key may be created using an algorithm and may be related to each other. The public key may be distributed to the plurality of nodes 305. The private key may be kept by an individual node 305 to digitally sign any transaction occurring in the distributed ledger. The receiving party of a transaction that has been signed may verify the data within the transaction by using the public key. One of ordinary skill in the art would recognize that any known digital signature systems may be used without departing from the spirit and scope of the present invention.

Figure 4:
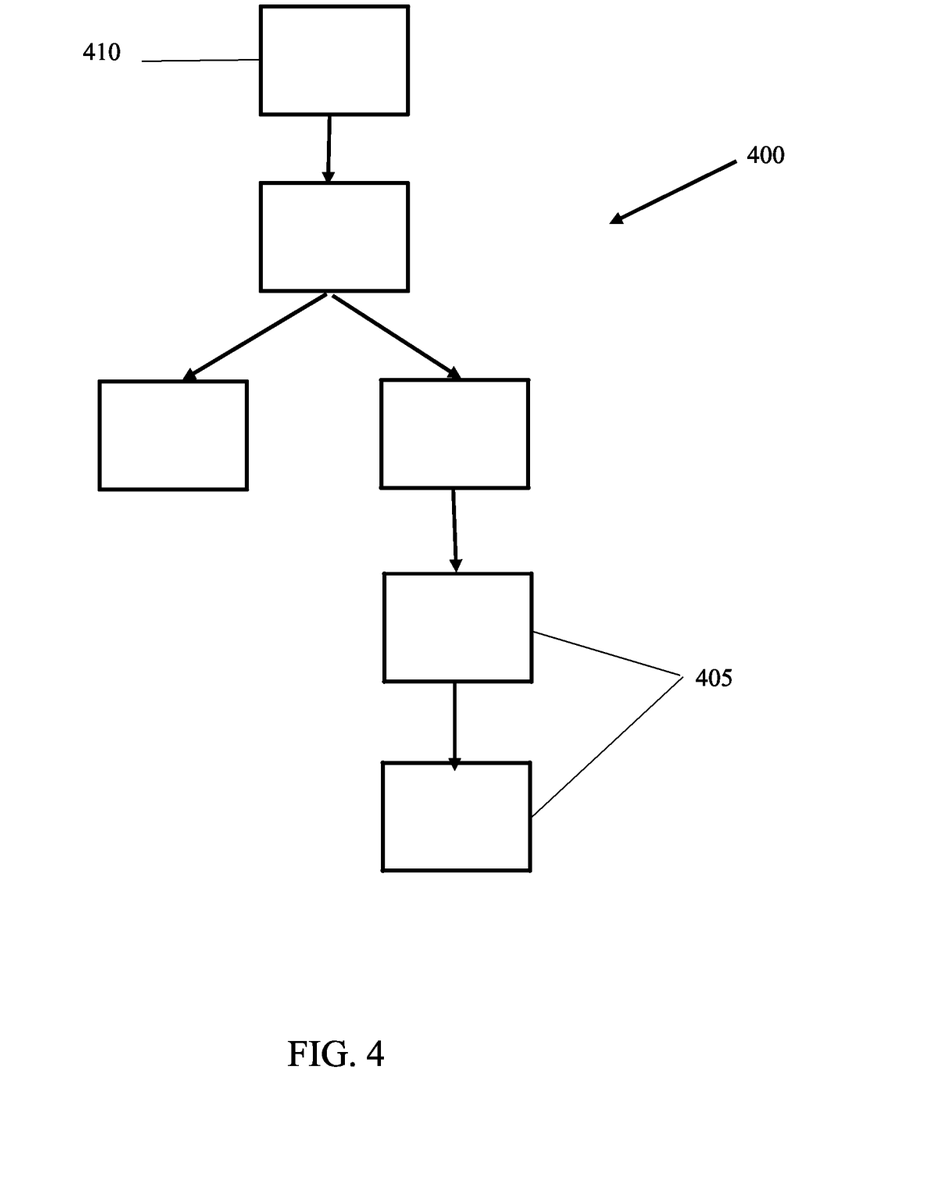
FIG. 4 is a diagram illustrating an example blockchain, in accordance with embodiments of the present disclosure.

FIG. 4 illustrates an example of a blockchain 400. There may be a plurality of blocks 405 within blockchain 400. In examples, a first block 410 may represent the first data transactions within the distributed ledger. The first block 410 may include any suitable size of data. A hash function may be used to generate an output value (e.g., a "hash") from the first data transactions. For each subsequent block 405 added to blockchain 400, the input to the hash function of the new block may include the previous block's hash and the data transactions represented by the new block. This may produce a system wherein the plurality of blocks 405 are linked, in sequential order, by the previous block's output value of the hash function. The linked blocks 405 may allow the plurality of nodes 305 (referring to FIG. 3) to follow the blockchain 400 backwards, from progression, in order to observe and verify data transactions. In examples, any suitable data mining technique may be used to verify and/or create the addition of a block in blockchain 400.

Figure 5:
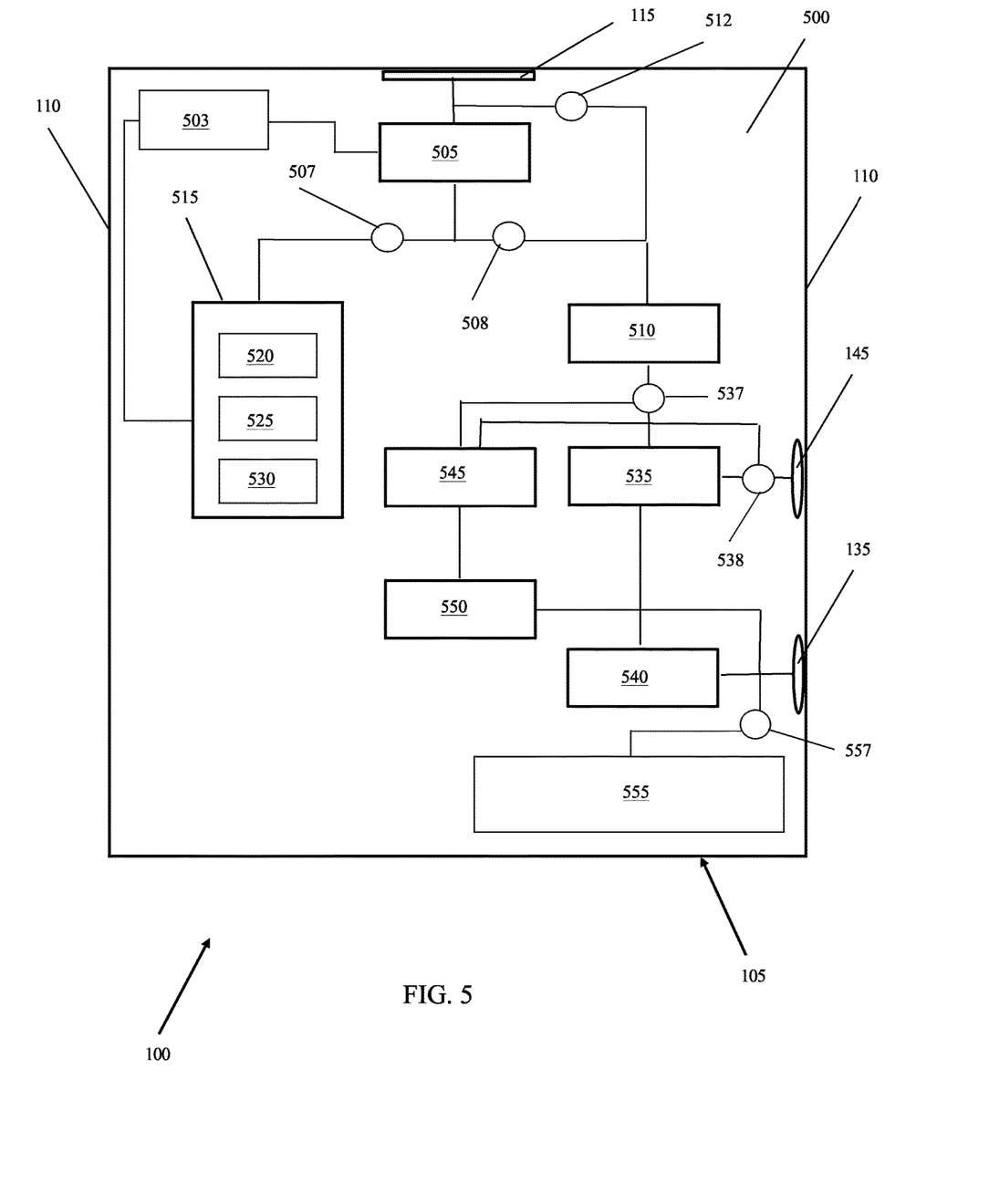
FIG. 5 is a cross-sectional view of a botanical processing module, in accordance with embodiments of the present disclosure.

FIG. 5 illustrates a cross-sectional view of the botanical processing module 100. The housing 105 of the botanical processing module 100 may define an internal cavity 500 between the plurality of surfaces 110. In embodiments, there may be any suitable equipment disposed within the housing 105 in the internal cavity 500 configured to physically and/or chemically change a designated material. Without limitations, such equipment may include funnels, pathways, piping, conduit, grinders, screens, filters, rollers, cutters, blades, pulleys, belts, plates, teeth and/or protrusions, and/or combinations thereof. The equipment may be coupled together by any suitable means and/or any suitable fasteners. In embodiments, there may be a motor 503 disposed within the housing 105, wherein operation of the motor 503 actuates at least some of the equipment. The motor 503 may be any suitable electric motor configured to convert electricity into mechanical energy.

In one or more embodiments, there may be means for physically altering the state of the designated material entering into the botanical processing module 100. Such means may include a grinder 505. In alternate embodiments, the grinder 505 may be replaced with or work concurrently with a shredder, cutters, blades, and any combination thereof. As illustrated, the grinder 505 may be disposed adjacent to or near the first inlet 115. In embodiments, the grinder 505 may be positioned so that the designated material that may pass through the first inlet 115 may be deposited into or onto the grinder 505. In alternate embodiments, the designated material may travel through conduit coupling the first inlet 115 to the grinder 505. The grinder 505 may be configured to reduce the designated material into smaller portions through shearing said designated material once actuated.

As illustrated, the grinder 505 may be coupled to a first heating chamber 510 and a means for packing 515. Without limitations, the motor 503 may be coupled to and actuated to operate the grinder 505 and the means for packing 515. There may be a first valve 507 disposed between the grinder 505 and the means for packing 515. There may further be a second valve 508 disposed between the grinder 505 and the first heating chamber 510. During operations, actuation of the first valve 507 and the second valve 508 may determine which pathway the reduced designated material may take (for example, introduction into either the means for packing or the first heating chamber 510). In embodiments, the first heating chamber 510 may be any suitable size and/or shape.

The first heating chamber 510 may be coupled to the grinder 505 directly or through conduit. In embodiments, the first heating chamber 510 may be configured to apply heat to the reduced designated material. Without limitations, the first heating chamber 510 may comprise a heating element configured to raise the temperature within the first heating chamber 510 to about 550° C. In embodiments, the first heating chamber 510 may be sealable in relation to the internal cavity 500. In one or more embodiments, the designated material may bypass the grinder 505 when introduced into the botanical processing module 100 and travel straight to the first heating chamber 510. In these embodiments, a third valve 512 may be actuated in order to open a pathway from the first inlet 115 to the first heating chamber 510. The third valve 512 may be closed in a first position, wherein the designated material would be directed to the grinder 505. The third valve 512 may be actuated to open in a second position, wherein the designated material would be directed to the first heating chamber 510.

The first heating chamber 510 may be coupled to a first containment chamber 535. The first heating chamber 510 may be coupled to the first containment chamber 535 directly or through conduit. As illustrated, there may be a fourth valve 537 disposed downstream from the first heating chamber 510, wherein actuation of the fourth valve 537 may introduce the reduced designated material into the first containment chamber 535 after being heated within the first heating chamber 510. In embodiments, the first containment chamber 535 may be configured to introduce a fluid from an external source to the botanical processing module 100 to interact with the heated, reduced designated material. In embodiments, the second inlet 145 may be coupled to the first containment chamber 535. There may be a fifth valve 538 disposed between the second inlet 145 and the first containment chamber 535, wherein actuation of the fifth valve 538 may introduce a fluid into the first containment chamber 535. The second inlet 145 may be configured to provide liquid carbon dioxide to flow into the first containment chamber 535. In embodiments, the liquid carbon dioxide may be in a supercritical state. In embodiments, the first containment chamber 535 may be capable of being pressurized to a designated pressure. Without limitations, during operations, the first containment chamber 535 may be pressurized so as to allow the liquid carbon dioxide to maintain its state of matter.

As illustrated, the first containment chamber 535 may be coupled to a separator 540. In embodiments, the separator 540 may be a pressure vessel configured to separate a fluid into gaseous and liquid components. The first containment chamber 535 may be coupled to the separator 540 directly or through conduit. As illustrated, the first outlet 135 may be coupled to the separator 540. In embodiments, as the separator 540 operates, the products of the operation of the separator 540 may be transported out of the botanical processing module 100 through the first outlet 135.

In one or more embodiments, the first heating chamber 510 may be coupled to a second containment chamber 545. The first heating chamber 510 may be coupled to the second containment chamber 545 directly or through conduit. In one or more embodiments, the fourth valve 537 may be a three-way valve configured to open and/or close pathways from the first heating chamber 510 to the first containment chamber 535 and the second containment chamber 545. In embodiments, the second containment chamber 545 may be configured to introduce a fluid from an external source to the botanical processing module 100 to interact with the heated, reduced designated material. In embodiments, the second inlet 145 may be coupled to the second containment chamber 545. Further, the fifth valve 538 may be a three-way valve configured to open and/or close pathways from the second inlet 145 to the first containment chamber 535 and the second containment chamber 545. The second inlet 145 may be configured to provide a fluid to flow into the second containment chamber 545. Without limitations, the fluid may be ethanol, butane, pentane, hexane, isopropyl alcohol, acetone, or any other hydrocarbon/alcohol solvent.

As illustrated, the second containment chamber 545 may be coupled to a second heating chamber 550. The second containment chamber 545 may be coupled to the second heating chamber 550 directly or through conduit. As illustrated, the first outlet 135 may be coupled to the second heating chamber. In embodiments, the product of the operation of the second heating chamber 550 may be transported out of the botanical processing module 100 through the first outlet 135. In embodiments, the second heating chamber 550 may be any suitable size and/or shape. In embodiments, the second heating chamber 550 may be configured to apply heat to the mixture of the reduced designated material and the fluid provided through the second inlet 145. Without limitations, the second heating chamber 550 may comprise a heating element configured to raise the temperature within the second heating chamber 550 to any suitable value. Without limitations, such a temperature may be to about 200° C., about 250° C., about 300° C., about 550° C., or about 400° C. The second heating chamber 550 may increase the temperature in order to cause a portion of the fluid present in the mixture to evaporate. One of ordinary skill in the art will recognize that the second heating chamber 550 may be configured to increase the temperature to the point of vaporization for the designated fluid introduced through the second inlet 145. In embodiments, the evaporated fumes or gases may exit the botanical processing module 100 through the first outlet 135 along with the remaining fluid from the mixture. In alternate embodiments, the evaporated fumes or gases may exit the botanical processing module 100 through the third outlet 165 (referring to FIG. 1) while the remaining fluid from the mixture may exit through the first outlet 135.

The botanical processing module 100 may further comprise a liquid composition analyzer 555. The liquid composition analyzer 555 may be any suitable device capable of performing liquid chromatography on a sample of fluid in order to identify the composition of the fluid. Without limitations, any method of chromatography may be utilized by the liquid composition analyzer 555. As illustrated, the liquid composition analyzer 555 may be fluidly coupled downstream of the second heating chamber 550 and the separator 540. A sixth valve 557 may be disposed upstream of the liquid composition analyzer 555, wherein the sixth valve 557 may be closed in a first position and open in a second position. Actuation of the sixth valve 557 from a first position to a second position may at least partially open a fluid pathway to the liquid composition analyzer 555 from either the second heating chamber 550 or the separator 540. In embodiments, the liquid composition analyzer 555 may be configured to separate, identify, and quantify each component in a mixture. The liquid composition analyzer 555 may be further configured to transmit signals to the controller 170 (referring to FIG. 1) to communicate that information, wherein the controller 170 may receive these signals then subsequently transmit that information as separate signals to the common network 175 (referring to FIG. 1).

With reference back to the grinder 505, the grinder 505 may be coupled to the means for packing 515. In embodiments, the means for packing 515 may comprise a conveyor belt 520, a secondary funnel 525, and one or more rollers 530. In one or more embodiments, the secondary funnel 525 may be coupled to the grinder 505 via conduit. The conveyor belt 520 may be disposed within the internal cavity 500 so as to connect the third inlet 160 (referring to FIG. 1) to the second outlet 150 (referring to FIG. 1). The one or more rollers 530 may be disposed along a portion of the conveyor belt 520 between the secondary funnel 525 and the second outlet 150. In embodiments, the conveyor belt 520 may be configured to transport the wrap paper from the third inlet 160 to the second outlet 150. The secondary funnel 525 may be configured to dispense reduced designated material from the grinder 505 onto at least a portion of each unit of wrap paper as it is transported on the conveyor belt 520. The one or more rollers 530 may be configured to roll each one of the wrap papers with reduced designated material disposed thereon into generally cylindrical shapes. In embodiments, the conveyor belt 520 may deposit individually rolled wrap papers containing reduced designated material onto the internal ledge 155 (referring to FIG. 1) of the second outlet 150.

Figure 6:
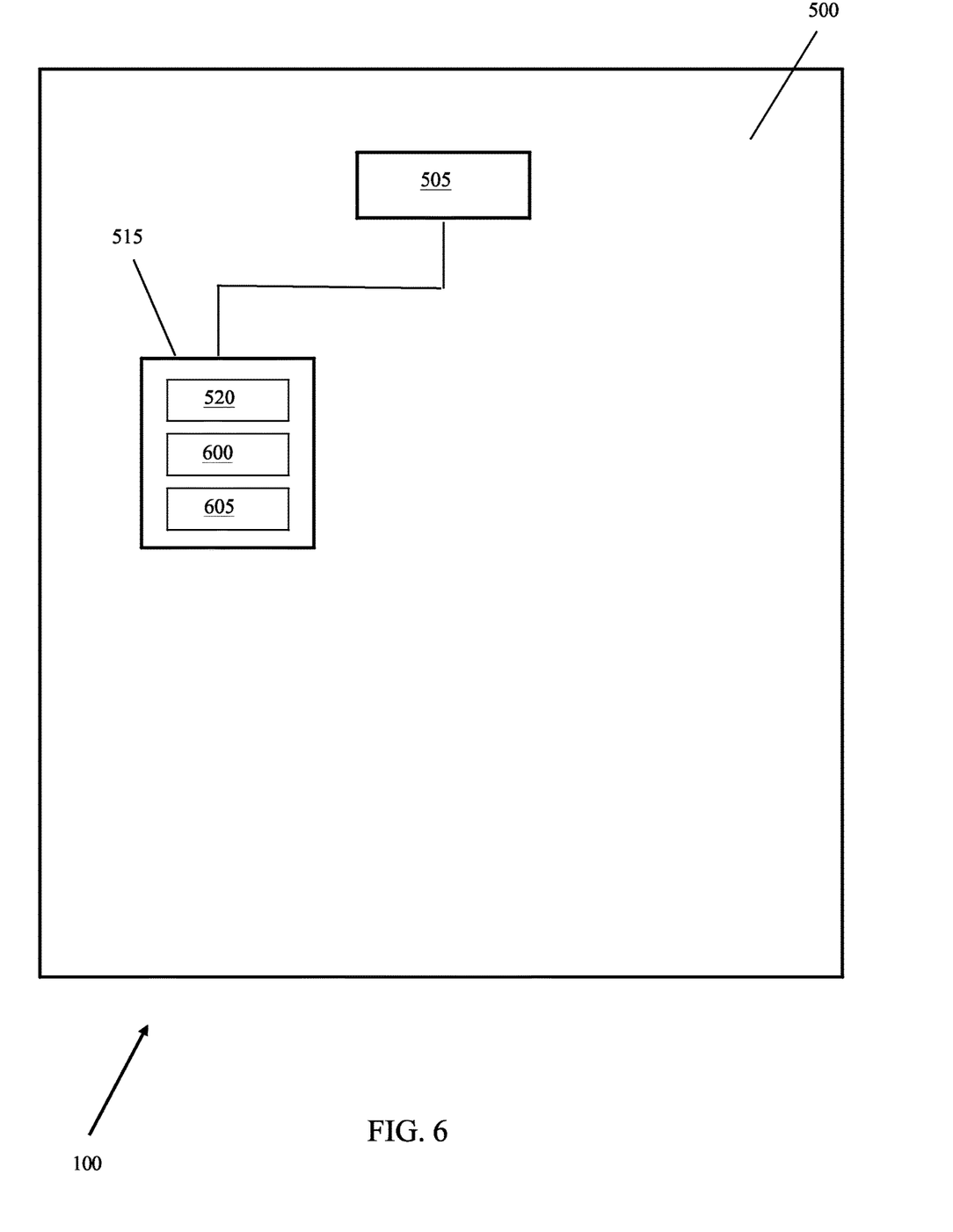
FIG. 6 is a cross-sectional view of a botanical processing module, in accordance with embodiments of the present disclosure.

FIG. 6 illustrates a cross-sectional view of another embodiment of the botanical processing module 100. The embodiment illustrated in FIG. 6 may comprise each component previously described in FIG. 5 with differences present in the means for packing 515. As such, the means for packing 515 illustrated in FIG. 6 may be used in conjunction with the botanical processing module 100 of FIG. 5. In the present embodiment, the means for packing 515 may comprise a packer container 600, a packing rod 605, and the conveyor belt 520. In this embodiment, the packer container 600 may be coupled to the grinder 505 via conduit. The packer container 600 may be configured to contain the reduced designated material for a period of time. The packer container 600 may be actuated to dispense a portion of the reduced designated material disposed within the packer container 600. The packer rod 605 may be disposed adjacent to the packer container 600 and aligned so that the dispensed portion of reduced designated material is within the path of motion of the packer rod 605. The conveyor belt 520 may be disposed within the internal cavity 500 so as to connect the third inlet 160 (referring to FIG. 1) to the second outlet 150 (referring to FIG. 1). The conveyor 520 may be similarly configured to transport materials from the third inlet 160 to the second outlet 150. In the present embodiment, the third inlet 160 may receive and contain pre-rolled wrap papers, wherein the pre-rolled wrap papers are in a cylindrical shape. The conveyor 520 may comprise partitions (not shown) so as to orient the pre-rolled wrap papers in a certain configuration. In embodiments, the packer rod 605 may be actuated to move linearly and force the dispensed portion of reduced designated material into one of the pre-rolled wrap papers once the one of the pre-rolled wrap papers is in-line with the path of motion of the packer rod 605. In embodiments, the conveyor belt 520 may deposit each pre-rolled wrap paper containing reduced designated material onto the internal ledge 155 (referring to FIG. 1) of the second outlet 150.

During operations, with reference to the figures, an operator may dispose designated material into the botanical processing module 100 through the first inlet 115. Any suitable amount or volume of designated material may be disposed into the botanical processing module 100. Once the operator disposes the designated material into the botanical processing module 100, the operator may choose any suitable operation to be performed via the controller 170. In embodiments, the controller 170 may instruct the botanical processing module 100 to prepare rolled wrap papers comprising a portion of reduced designated material and/or produce a desired by-product to be collected from the first outlet 135. In certain embodiments, the controller 170 may control the dispensation of reduced designated material from the grinder 505 into individual wrap papers and/or pre-rolled wrap papers. In these embodiments, the controller 170 may control the speed of the conveyor belt 520 and the timing and location of wrap papers disposed on the conveyor belt 520 in relation to either the secondary funnel 525 or the packing rod 605. In embodiments, the controller 170 may instruct the first heating chamber 510 to increase the temperature to a designated value for a period of time. Without limitations, such a period of time may be anywhere from about 5 minutes to about 5 hours. In similar embodiments, the controller 170 may instruct the second heating chamber 550 to increase the temperature to a designated value for a period of time, wherein the period of time may be similar to the period of time used for the first heating chamber 510.

In embodiments, the botanical processing module 100 may apply a solvent and/or liquid carbon dioxide to the designated material through the second inlet 145. This may occur after the process of grinding and/or shredding the designated material with the grinder 505. The solvent and/or liquid carbon dioxide may surround, encompass, pass through, and/or combinations thereof the reduced designated material for a suitable amount of time to produce a mixture. In these embodiments, the mixture may undergo a further process through either the separator 540 or the second heating chamber 550 then may flow out of the botanical processing module 100 through the first outlet 135. In embodiments, the mixture may be disposed in an external container for further processing.

Figure 7:
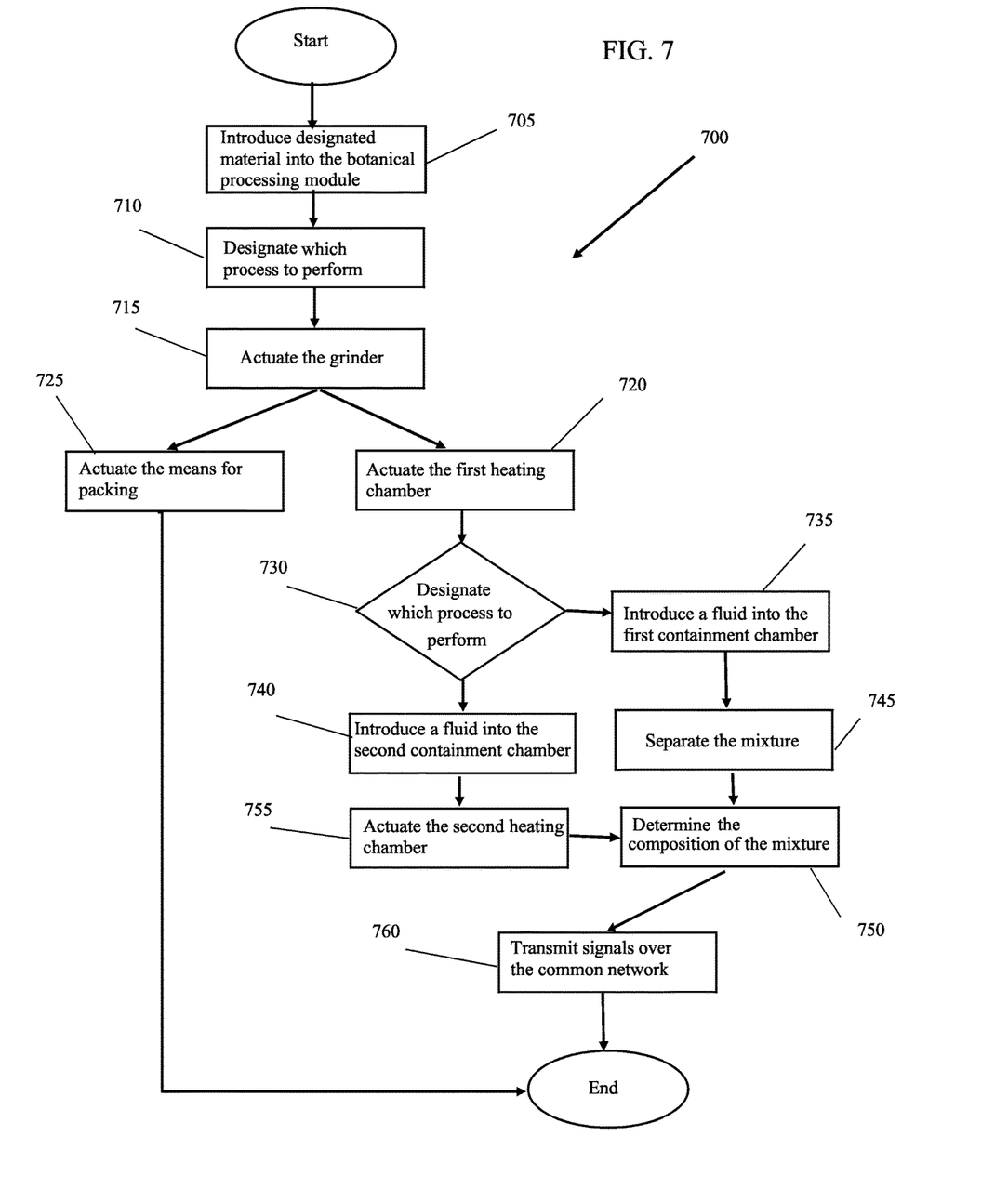
FIG. 7 illustrates an example method of operation of the botanical processing module of FIG. 1, in accordance with embodiments of the present disclosure.

FIG. 7 is a flow diagram illustrating an example method 700 of the botanical processing module 100 of FIGS. 1-6. The method 700 may be implemented using the botanical processing module 100. The method 700 may begin at step 705 where an operator may dispose or introduce designated material into the botanical processing module 100. Any suitable amount or volume of designated material may be disposed into the botanical processing module 100. The designated material may be disposed in the funnel 120 wherein the funnel 120 may be partially disposed through the first inlet 115.

At step 710, the operator may input a designation into the controller 170 of which process to perform. The operator may be provided with a choice of either directing the designated material to the first heating chamber 510 or to the means for packing 515. The operator may further select whether the designated material should be introduced into the grinder 505 before introduction into the first heating chamber 510. Once a determination has been made, the processor 201 of the controller 170 may instruct the bottom end 130 of the funnel 120 to open, thereby allowing the designated material to exit the funnel and pass through the first inlet 115 via gravity. If the operator selects that the designated material should not pass through the grinder 505 before being introduced into the first heating chamber 510, the processor 201 may instruct the third valve 512 to actuate to an open position to allow the designated material to bypass the grinder 505 and flow to the first heating chamber 510. If the operator selects that the designated material should pass through the grinder 505 before being introduced into the first heating chamber 510 or if the operator selects that the designated material should be directed to the means for packing 515, the designated material may be introduced into the grinder 505.

At step 715, the processor 201 may instruct the grinder 505 to actuate to reduce the designated material into smaller portions through shearing said designated material. The processor 201 may instruct the grinder 505 to operate for any period of time. After the period of time has elapsed, the processor 201 may instruct the grinder 505 to stop operating.

In response to the operator determining that the botanical processing module 100 is to direct the designated material to the first heating chamber 510, the method 700 may proceed to step 720. In response to the operator determining that the botanical processing module 100 is to direct the designated material to the means for packing 515, the method 700 may proceed to step 725.

At step 720, the processor 201 may instruct the second valve 508 to open in order to direct the reduced designated material to be introduced into the first heating chamber 510. Once the reduced designated material is disposed within the first heating chamber 510, the processor 201 may instruct the first heating chamber 510 to actuate to increase the temperature within the first heating chamber 510 to a certain temperature for a period of time.

At step 730, the operator may input a designation into the controller 170 of which process to perform. The operator may be provided with a choice of either directing the reduced designated material to the first containment chamber 535 or to the second containment chamber 545 after being heated by the first heating chamber 510. If the operator selects to direct the reduced designated material to the first containment chamber 535, the processor 201 may instruct the fourth valve 537 to actuate to allow the reduced designated material to be introduced into the first containment chamber 535 at a step 735. If the operator selects to direct the reduced designated material to the second containment chamber 545, the processor 201 may instruct the fourth valve 537 to actuate to allow the reduced designated material to be introduced into the second containment chamber 545 at a step 740.

At step 735, the processor 201 may instruct the fifth valve 538 to actuate to introduce a fluid from an external source through the second inlet 145 into the first containment chamber 535 once the heated, reduced designated material is within the first containment chamber 535. The processor 201 may further instruct the first containment chamber 535 to pressurize or increase the internal pressure up to a certain value.

At step 745, the mixture of the heated, reduced designated material with the fluid from the external source may flow from the first containment chamber 535 to the separator 540. The processor 201 may instruct the separator 540 to actuate to separate the mixture of the heated, reduced designated material with the fluid into gaseous and liquid components. Once the mixture has been separated, the method 700 may proceed to step 750.

At step 740, the processor 201 may instruct the fifth valve 538 to actuate to introduce a fluid from an external source through the second inlet 145 into the second containment chamber 545 once the heated, reduced designated material is within the second containment chamber 545. The processor 201 may further instruct the second containment chamber 545 to pressurize or increase the internal pressure up to a certain value.

At step 755, the mixture of the heated, reduced designated material with the fluid from the external source may flow from the second containment chamber 545 to the second heating chamber 550. The processor 201 may instruct the second heating chamber 550 to actuate to increase the temperature within the second heating chamber 550 to a certain temperature for a period of time in order to cause a portion of the fluid present in the mixture to evaporate. In embodiments, the portion of the fluid that evaporates may exit the botanical processing module 100 through the first outlet 135 with the remaining portions of the mixture and/or through the third outlet 165. The method 700 may then proceed to step 750.

At step 750, a sample of the fluid from either step 745 or step 755 may be directed to the liquid composition analyzer 555. The processor 201 may instruct the sixth valve 557 to actuate to divert the sample from the flow to the first outlet 135. The sample may be introduced into the liquid composition analyzer 555, wherein the processor 201 may instruct the liquid composition analyzer 555 to actuate to identify the composition of the sample, and subsequently that of the fluid from either of step 745 or step 755. In embodiments, the liquid composition analyzer 555 may be actuated to transmit the resulting information to the processor 201. The processor 201 may be configured to receive the information from the liquid composition analyzer 555. While the liquid composition analyzer 555 is operating, the fluids from the separator 540 and/or the second heating chamber 550 may be flowing out of the botanical processing module 100 through the first outlet 135.

At step 760, the processor 201 may transmit signals to the common network 175 while the processor 201 is communicatively coupled to the common network 175. In embodiments, the network interface 211 of the controller 170 may have established a connection between the controller 170 and the common network 175 in order for communication to occur between the two. In one or more embodiments, the common network 175 may be a decentralized computing network 300, wherein the controller 170 may act as one of a plurality of nodes 305. In these embodiments, the decentralized computing network 300 may be configured to store information, data, and/or parameters concerning the operation of one or more botanical processing modules 100. The decentralized computing network 300 may be a private network wherein access to each node 305, as an operator, requires pre-authorization (for example, through log-in credentials).

A plurality of the one or more botanical processing modules 100 may be configured to transmit signals over the decentralized computing network 300. For example, the resultant composition of the fluid analyzed by the liquid composition analyzer 555 may be broadcast from the controller 170 of one of the one of more botanical processing modules 100 to the decentralized computing network 300. An operator operating a separate computing system acting as a node 305 may be configured to parse through the decentralized computing network 300 using blockchain protocols in order to access that information. Further, the operator may be able to monitor any suitable maintenance parameters of each of the one or more botanical processing modules 100 communicatively connected over the decentralized computing network 300. In other embodiments, the operator may be able to transmit signals to a specific one of the one or more botanical processing modules 100 to instruct the processor 201 of that botanical processing module 100 to actuate certain components during operation. The method 700 may then conclude after step 760.

With reference back to step 725, the processor 201 may instruct the first valve 507 to open in order to direct the reduced designated material to be introduced into the means for packing 515. Once the reduced designated material is introduced into the means for packing 515, the processor 201 may instruct the conveyor belt 520 to actuate to transport the wrap paper from the third inlet 160 to the second outlet 150. While the conveyor belt 520 is operating, the processor 201 may actuate either the one or more rollers 530 or the packer rod 605 depending on the embodiment of the means for packing 515. The conveyor belt 520 may then deposit individually rolled wrap papers containing reduced designated material onto the internal ledge 155 of the second outlet 150. The method 700 may then conclude after step 760.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing" or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

What is claimed is:
1. A botanical processing module, comprising:
   a housing having a plurality of walls defining an internal cavity, including:
      a first inlet extending through a top wall surface of the housing for the introduction of a designated material to be processed into the internal cavity;

a second inlet extending through a side wall surface of the housing for introduction of a fluid to be mixed with the designated material into the internal cavity;

a first outlet extending through the side wall surface for the discharge of a produced mixture from the internal cavity;

a grinder disposed within the internal cavity of the housing and positioned to:
  receive the designated material from the first inlet, and
  reduce the designated material into smaller portions through shearing;

a first heating chamber disposed within the internal cavity of the housing and downstream of the grinder, the first heating chamber being sized, shaped and positioned to receive the reduced smaller portions of the designated material from the grinder, the first heating chamber including means for increasing the temperature of the reduced designated material within the first heating chamber;

and a controller including a processor configured to:
  transmit an instruction to actuate the grinder to reduce the designated material into the smaller portions;
  transmit an instruction to actuate the means for increasing the temperature of the reduced designated material within the first heating chamber to increase the temperature of the reduced designated material within the first heating chamber; and
  transmit an instruction to perform liquid chromatography on a sample of a received fluid in order to identify the composition of the received fluid, wherein the received fluid is a sample of the produced mixture of the fluid introduced from the second inlet and the reduced designated material.

2. The botanical processing module of claim 1, further comprising a first containment chamber.

3. The botanical processing module of claim 2, wherein the first containment chamber is disposed within the housing in the internal cavity and downstream of the first heating.

4. The botanical processing module of claim 2, wherein the first containment chamber is in fluid communication with the second inlet.

5. The botanical processing module of claim 2, further comprising a second containment chamber and a second heating chamber.

6. The botanical processing module of claim 5, wherein the second containment chamber and the second heating chamber are disposed within the housing in the internal cavity, wherein the second containment chamber is positioned downstream of the first heating chamber and the second heating chamber.

7. The botanical processing module of claim 5, wherein the second containment chamber is in fluid communication with the second inlet, wherein the second heating chamber is in fluid communication with the first outlet.

8. The botanical processing module of claim 1, wherein the processor is further configured to transmit the composition of the received fluid to a common network.

9. The botanical processing module of claim 8, wherein the common network comprises a decentralized computing network, wherein the processor is configured to utilize blockchain protocols to access the common network.

* * * * *